United States Patent
Martin et al.

(10) Patent No.: US 8,543,581 B2
(45) Date of Patent: Sep. 24, 2013

(54) SYNCHRONIZING RECORDS BETWEEN DATABASES

(75) Inventors: Pierre N. Martin, Haguenau (FR); Bryan Dove, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 76 days.

(21) Appl. No.: 13/079,027

(22) Filed: Apr. 4, 2011

(65) Prior Publication Data

US 2012/0254105 A1    Oct. 4, 2012

(51) Int. Cl.
*G06F 7/00* (2006.01)

(52) U.S. Cl.
USPC .......................................... 707/748

(58) Field of Classification Search
USPC ................................. 707/758, 648
See application file for complete search history.

(56) References Cited

U.S. PATENT DOCUMENTS

| | | | |
|---|---|---|---|
| 6,631,379 B2 | 10/2003 | Cox | |
| 7,313,576 B2 | 12/2007 | Clark et al. | |
| 7,418,441 B2 | 8/2008 | Hamel et al. | |
| 7,814,045 B2 | 10/2010 | Hermann et al. | |
| 2004/0024795 A1 * | 2/2004 | Hind et al. | 707/204 |
| 2005/0251812 A1 | 11/2005 | Hayward | |
| 2010/0114831 A1 * | 5/2010 | Gilbert et al. | 707/648 |

OTHER PUBLICATIONS

Jackson, Joab., "EMC Tackles Big Data with Greenplum Appliance", Retrieved at << http://www.networkworld.com/news/2010/101310-emc-tackles-big-data-with.html >>, Oct. 13, 2010, pp. 2.

Metzger, Hanna., "Load and Attach: Updating Data Warehouse Tables", Retrieved at << http://www.ibm.com/developerworks/data/zones/informix/library/techarticle/0206metzger/0206metzger2.html >>, Jun. 5, 2002, pp. 10.

Loshin, David., "Gaining the Performance Edge Using a Column-Oriented Database Management System", Retrieved at << http://www.sybase.com/files/White_Papers/Performance-Column-DBM-041509-WP.pdf >>, White Paper, Mar. 1, 2009, pp. 12.

"KIM Validation for EO archived data exploitation support", Retrieved at << http://earth.eo.esa.int/rtd/Projects/KIMV/index.html >>, Retrieved Date: Dec. 1, 2010, pp. 4.

* cited by examiner

*Primary Examiner* — Truong Vo

(57) ABSTRACT

The described implementations relate to synchronizing records between databases. One implementation can cause historical data of a source database to be recorded as entries on a transaction log and can subsequently cause new data of the source database to be recorded on the transaction log in a same manner as the historical data. This implementation can also identify a distinct attribute associated with an individual entry and generate a message that reflects the individual entry.

20 Claims, 4 Drawing Sheets

SYNCHRONIZING RECORDS BETWEEN DATABASES

BACKGROUND

In information technology arenas, synchronizing databases can be time consuming and error prone. For instance, converting and loading a history of electronic records, such as patient records, from one information system to another is a lengthy process. For example, patient files often include huge amounts of imaging data, such as MRI images and CT images. Accordingly, database synchronization of patient records often takes weeks to even months when the databases relate to large numbers of patients. Generally a first technique is utilized to convert and upload existing or historic data from one database to another. A different technique is then used to try to maintain synchronization between the databases as changes occur to the patient records.

SUMMARY

The described implementations relate to synchronizing records between databases. One implementation can cause historical data of a source database to be recorded as entries on a transaction log and can subsequently cause new data of the source database to be recorded on the transaction log in a same manner as the historical data. This implementation can also identify a distinct attribute associated with an individual entry and generate a message that reflects the individual entry.

Another implementation can receive a message that conveys an individual entry from a transaction log of historical and new database entries. This implementation can also create metadata for the message that includes a distinct identifier for the individual entry. Processing of the message for uploading in a target database format is organized at least in part upon the distinct identifier.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This discussion relates to record synchronization between source and target databases. For example, in some implementations the records can be manifested as patient records that are synchronized between the source and target databases.

Some implementations can leverage transaction logs associated with the source database. Transaction logs can capture incremental changes made to a database. When starting up a transaction log on a database entity (table or view), the state of the database at start up can be captured as a unique change entry similar to the incremental changes. In some implementations, all changes can be captured in a message, such as an extensible markup language (XML) message that can convey all associated data change captured in the transaction log. The transaction logs can capture the entire set of data changes, and in particular can include metadata of records. The metadata of records can be used in a second stage to parallelize further processing of the data and uploading in a destination database.

FIRST METHOD EXAMPLE

Figure 1:
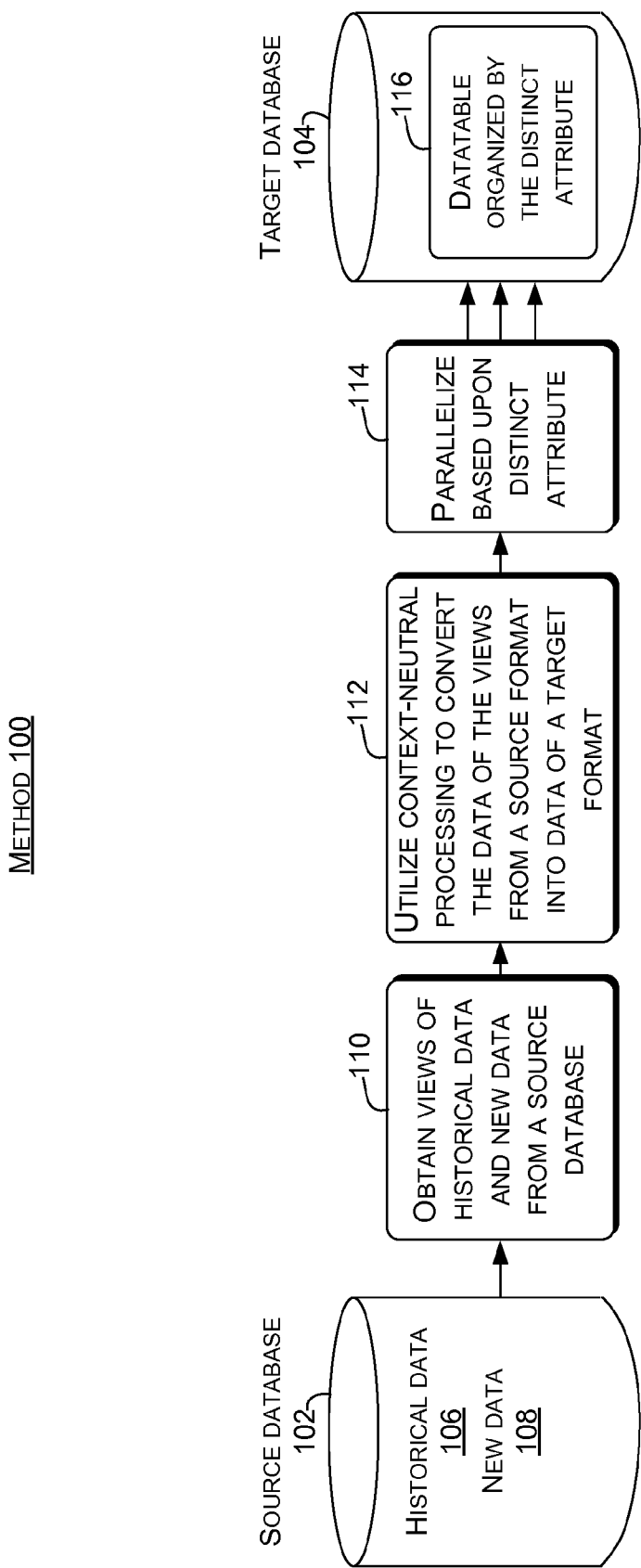
FIG. 1 shows an example of a record synchronization method in accordance with some implementations of the present concepts.

FIG. 1 shows an introductory example of a record synchronization method 100. The method 100 can facilitate obtaining data or content from a source database 102 and populating the data in a target database 104. Data in the source database 102 can be in a source format and data in the target database 104 can be in a target format. The target format and the source format may be the same format or different formats. Source database 102 can include historical data 106 and new data 108. Historical data can be thought of as data that was already stored in the source database at the time conversion was commenced. In contrast, new data can be thought of as data that is added to, changed, or deleted from the source database after the data conversion has commenced.

One or more views can be obtained of the historical data and the new data as indicated at block 110. From one perspective, the purpose of these views is to operate a transformation between the source format and the target format, and a grouping of data transactions in logical data feeds. In some cases, the obtaining can be accomplished by obtaining the views from another entity. In other cases, the obtaining can be accomplished by creating the views. Considered from one perspective, the views can be thought of as a query against a number of tables in the source database 102. In one such example, the view might be a query across several tables and if one of those tables changes the change can be conveyed in the view. In one implementation, the method can monitor whether any of the tables change a record. A record can be thought of as any type of data associated with a unique (e.g., distinct) attribute in the data set. In one example, the distinct attribute can be a unique identifier (e.g., patient identifier) associated with an individual patient. Data associated with that unique identifier can be thought of as a record or a portion of a record.

Context-neutral processing can be utilized to convert the data of the views from a source format into data of a target format at block 112. Viewed from one perspective, context-neutral processing can be thought of as using the same process to convert both the historical data 106 and the new data 108 from the source format to the target format. Stated another way, rather than treating historical data in one manner and new data in another manner, the present implementations can employ the same process for converting source data, whether historical or new, to target data. In some implementations, the change reflected in the view can be utilized to create a message, such as an XML message, that contains the data associated with the change. XML is only an example of a message format. Any expression of data on a message can be used as the message format, such as, for example a flat file, binary file, comma delimited, or pipe delimited file.

In one implementation, messages can be created in a target format from the output of block 112. The messages can reflect exactly the incremental changes on the source database segmented in logical data feeds and independently of the context of historical load or on-going live synchronization.

Further processing and uploading of the converted data can be parallelized based upon the distinct attribute of the converted data as indicated at block 114. Parallelization can allow for faster speed in committing the change transactions created in block 112 into the target database tables. For instance, in some implementations, the changes recorded in the messages are received at block 114. For a given format of electronic records, typical backload solutions use a single process to perform conversion of a given format of records. In contrast, the present implementations can define records of identical format as an ensemble of records that are identified by the exact same set of attributes, while the value of these attributes may differ between records. For example, records associated with an individual patient through a distinct patient ID can be processed together as a set. By segregating records of the same format on the same feed using distinct sets of values of the unique identifiers, records can be distributed to parallel processes that will commit the changes to the destination database. Parallelization in this case can be insensitive to the context, and can be identically performed on the initial backload and the on-going live change tracking.

The above configuration can allow a data table in the target database 104 to be organized by the distinct attribute as indicated at 116. For instance, where the distinct attribute is a patient identifier, the data table can be organized on a patient-by-patient basis.

In summary, some implementations can parallelize the process of converting and loading records between two information systems based on the content of the data being loaded. For a given format of electronic records, data can be transmitted and converted across multiple identical feeds from the source to the target information system, and records can be distributed across these feeds based on the value of given attributes of the data that is transmitted. As a result, the conversion and loading speed can be increased proportionally to the number of parallel data feeds. From another perspective, the above description can offer the ability to reconcile historical and real time data via a single process that can be made retroactive at any point in time.

SYSTEM EXAMPLE

Figure 2:
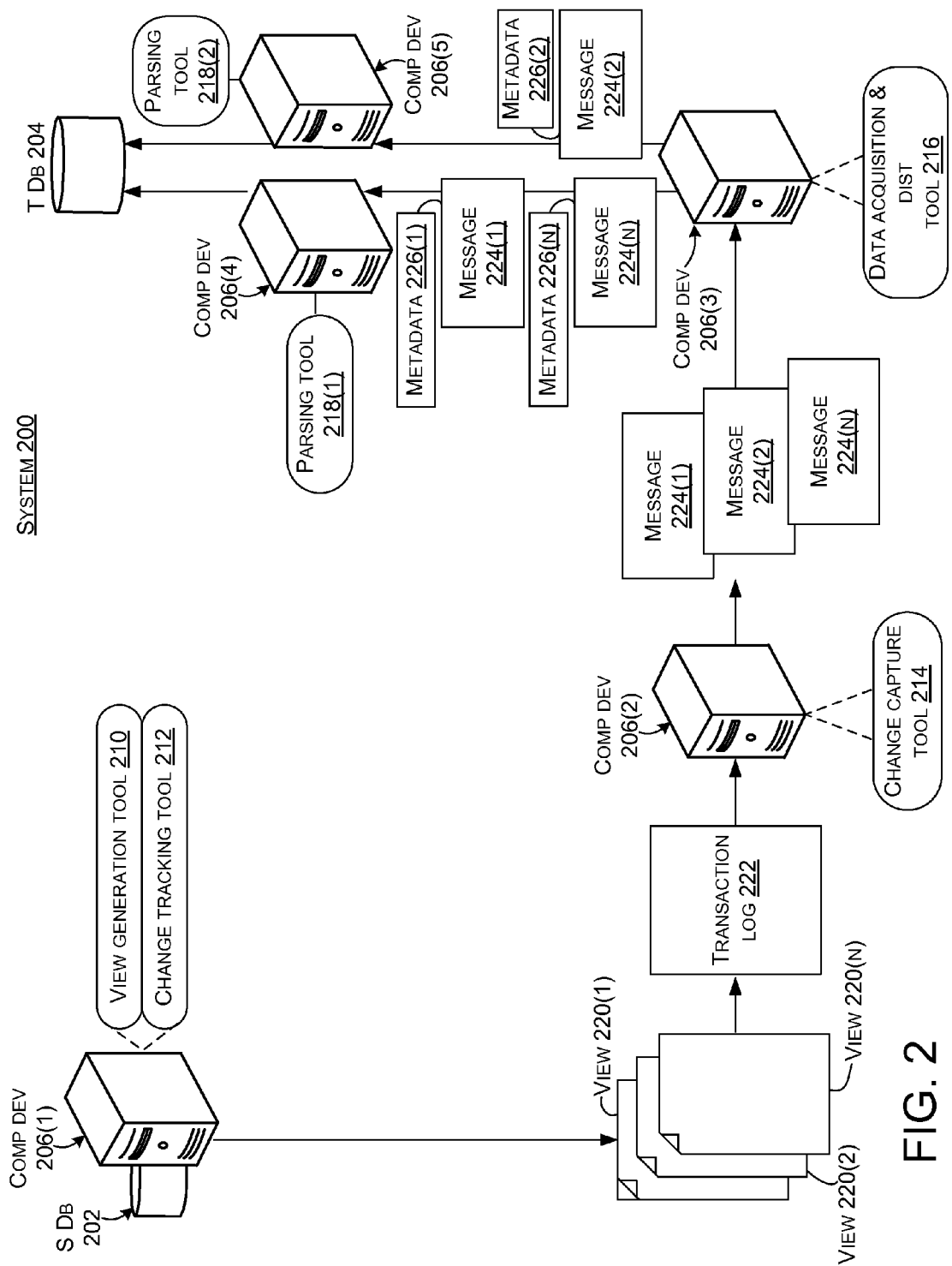
FIG. 2 shows an example of a record synchronization system in accordance with some implementations of the present concepts.

FIG. 2 shows an example of an implementation used for a patient record synchronization system 200. Example system 200 can include a source database 202, a target database 204, and one or more computing device(s) 206. In the illustrated case, five computing devices 206(1)-206(5) are shown, but the number of computers is not critical. Individual computing devices can communicate with one another and/or with the databases via one or more networks, such as the Internet, Local Area Network, Cellular Network, etc. In one configuration, computing devices 206(1) and 206(2) can be thought of as client-side or front-side computing devices and computing devices 206(3)-206(5) can be thought of as server-side or back-side computing devices. Other configurations can operate without such distinction. Further, while distinct computing devices are illustrated, some distributed configurations may utilize available computing resources that are not readily associated with a distinct device. For instances, cloud based resources may augment or replace one or more of the distinct computing devices illustrated in FIG. 2.

In system 200, computing device 206(1) includes a view generation tool 210 and a change tracking tool 212. Computing device 206(2) includes a change capture tool 214. Computing device 206(3) includes a data acquisition and distribution tool 216. Computing devices 206(4) and 206(5) include parsing tools 218(1) and 218(2), respectively. The function of these tools 210-218 is explained below.

View generation tool 210 can generate views 220(1), 220(2) and 220(N) from source database 202. In one example, the views 220(1)-220(N) can be thought of as some query against some number of tables in the source database 202. Any changes to the tables queried by the views, such as updates, inserts or deletes, can be captured in the views. In one implementation, the functionality of the view generation tool can be achieved via the materialized view feature offered on some database products. For instance, such features can be found on some Oracle brand database products, some DB2 brand database products, and some SQL Server brand database products, among others.

Change tracking tool 212 can monitor the views 220(1)-220(N) and can generate a transaction log 222. The transaction log can be thought of as a listing of existing data and any new entries (e.g., changes) from the views. In some implementations, when the transaction log is first created all data (e.g., historical data) is treated as a change in the transaction log. Subsequently, changes to the data (which includes new data and/or deletions) are listed in the transaction log.

Change capture tool 214 can identify the changes in the transaction log 222. This is sometimes referred to as change data capture. The change capture tool can create a message 224(1), 224(2), and 224(N) that conveys the data associated with an individual change. Various message formats can be utilized. For instance, the format could be comma delimited, pipeline delimited, etc. XML offers one example of a message format that can conveniently and clearly represent and parse the changes. In one case, the functionality of the change capture tool can be provided by GoldenGate™ brand replicator product offered by Oracle® Corp. In another instance the functionality of the change capture tool can be provided by the change data capture feature of SQL Server® offered by Microsoft® Corp.

The data acquisition and distribution tool 216 can receive the message 224(1)-224(N). In some implementations, the data acquisition and distribution tool can file copies of the messages for archiving. The data acquisition and distribution tool can also use archiving scripts to distribute the data associated with the messages in a manner that can facilitate parallel processing by computing devices 206(4) and 206(5).

The data acquisition and distribution tool 216 can also append some metadata to the received message 224(1)-224(N). For instance, metadata 226(1) is associated with message 224(1), metadata 226(2) is associated with message 224(2), and metadata 226(N) is associated with message 224(N). The metadata can be added to the message based on distinct attributes of the data. The data acquisition and distribution tool can pass data or content of the messages with the associated metadata to a message queue. The message queue can be utilized by the parsing tools 218(1) and 218(2) as described below. The metadata can be used to indicate that a given message belongs to a certain category (e.g., processing job). This aspect can allow multiple processing pipelines to be employed (as represented here by computing devices 206(4) and 206(5)).

In one example, the system may categorize all patient records and their associated visit information by the distinct value of their medical record number, which is a unique patient identifier in a source database. Two patient records with different medical record numbers can be sent to two parallel streams that will process and parse the record data in the target database at the same time. For instance, a set of patient records can be distributed over 16 parallel streams by using the modulus of the division of the patient number by 16 as the metadata to categorize the feeds, which can guarantee that all 16 data sets are distinct, and their union constitutes the ensemble of all source patient records. In another example, the system may send data associated with the first patient over all of the available parallel data processing streams until processing of the first patient is completed (or at least queued). The system can then send data associated with the second patient over available parallel data processing streams and so on.

Viewed from one perspective the data acquisition and distribution tool 216 can reduce the number of design constraints associated with the source feed. For instance, this can reduce or eliminate design constraints associated with how the source feed delivers the data. For example, the system does not have to segregate how the source feed delivers labs and images and how to optimize by patient as well. In fact, some system configurations do not need to affect or influence the source system at all.

Parsing tools 218(1) and 218(2) can execute parsing scripts that decode the messages 224(1)-224(N). The parsing tools can then pick the content of the message and write the content to the target database 204. Thus, the target database 204 can be constantly, periodically, and/or from time-to-time synchronized with the source database 202.

In summary, system 200 can offer a mechanism to reconcile historical and real time data via a single mechanism that can be made retroactive at any point in time.

The term "computer" or "computing device" as used herein can mean any type of device that has some amount of processing capability and/or storage capability. Processing capability can be provided by one or more processors that can execute data in the form of computer-readable instructions to provide a functionality. Data, such as computer-readable instructions, can be stored on storage. The storage can be internal and/or external to the computing device. The storage can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances. Computer-readable storage media includes "computer-readable storage devices". Examples of computer-readable storage devices include volatile storage media, such as RAM, and non-volatile storage media, such as hard drives, optical discs, and flash memory, among others.

Examples of computing devices can include traditional computing devices, such as personal computers, cell phones, smart phones, personal digital assistants, or any of a myriad of ever-evolving or yet to be developed types of computing devices. Further, aspects of system 200 can be manifest on a single computing device or distributed over multiple computing devices.

METHOD EXAMPLES

Figure 3:
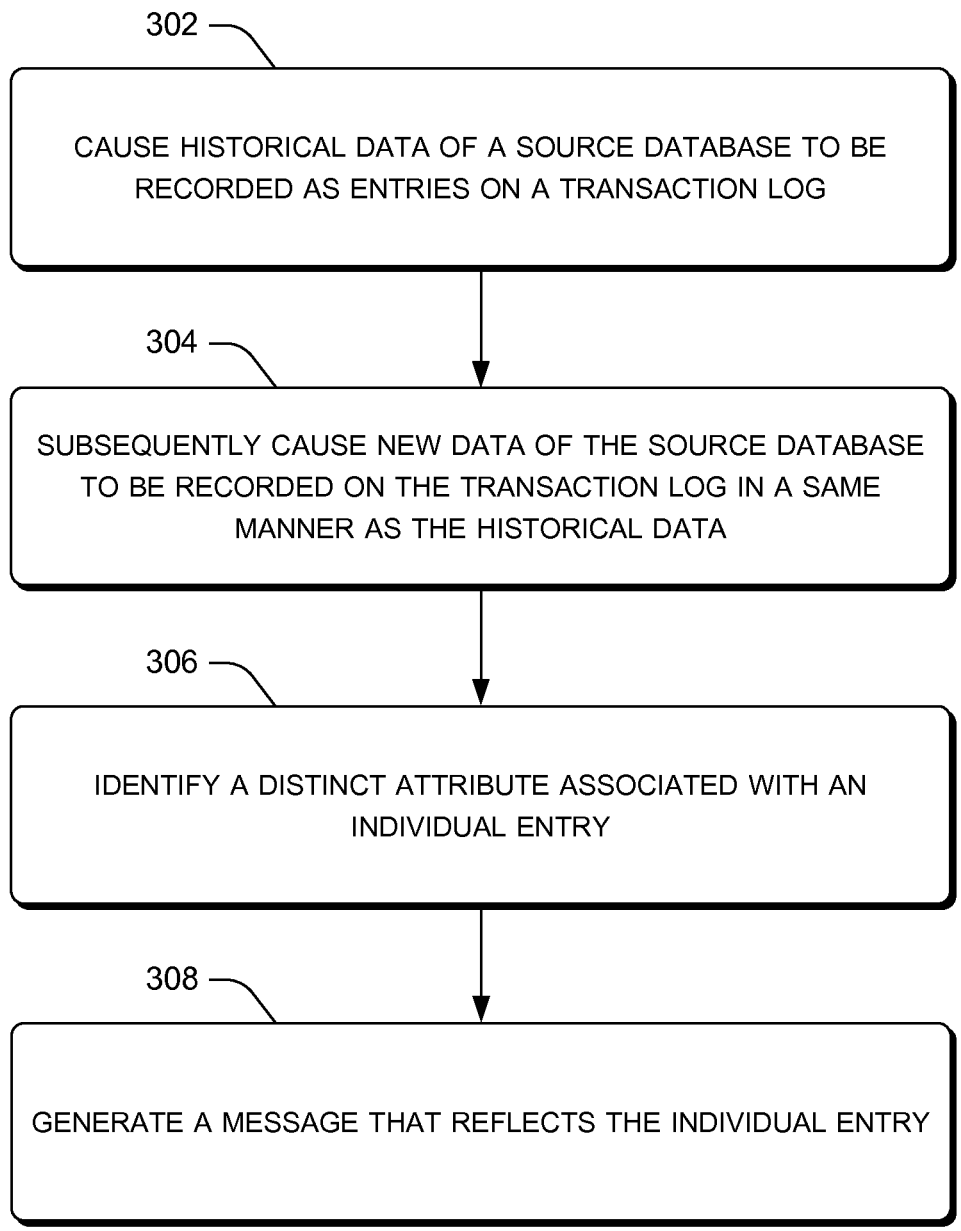
FIGS. 3-4 show examples of flowcharts of record synchronization methods in accordance with some implementations of the present concepts.

FIG. 3 illustrates a flowchart of a record synchronization technique or method 300. For purposes of explanation this record synchronization is explained relative to a patient record synchronization scenario.

At block 302, the method can cause historical data of a source database to be recorded as entries on a transaction log. In one implementation, the historical data can be semantically treated as new data upon start-up of the method. A view can be created that captures individual aspects of the historical data. The transaction log entries can be generated from the views. As an example, a database view can be created to join database tables and be materialized (e.g., materialized view). A transaction log can be then activated on the materialized view.

At block 304, the method can subsequently cause new data of the source database to be recorded on the transaction log in a same manner as the historical data. In the above mentioned implementation, data changes can be captured in views. The views can then be utilized in generating the transaction log. This functionality is natively provided, for example, by transaction logs in database products offered by Oracle® Corp., or SQL Server® offered by Microsoft® Corp., among others.

At block 306, the method can identify a distinct identifier or attribute associated with an individual entry. In some instances, the individual entries are already associated with a distinct identifier, such as a patient ID. These identifiers can be inferred directly from the source data tables. For instance, a first entry may be for lab results for "patient A", a second entry could be for images for patient A, a third entry could be blood pressure data (e.g., systolic and diastolic values) for patient A, and a fourth entry could be for blood pressure data for "patient B". In this example, all entries are represented by a unique patient identifier. In another example, the entries may not be associated with a distinct identifier. In such a case a distinct identifier can be created for individual entries, such as by hashing data of the entry.

At block 308, the method can generate a message that reflects the individual entry. For instance, where the individual entry is blood pressure data, the associated systolic and diastolic values can be conveyed by the XML message. Generation of messages is provided by a change capture function activated on the transaction log. As an example, change capture can be provided by GoldenGate™ brand replicator product offered by Oracle® Corp. In another instance the functionality of the change capture tool can be provided by the change data capture feature of SQL Server® offered by Microsoft® Corp.

Figure 4:
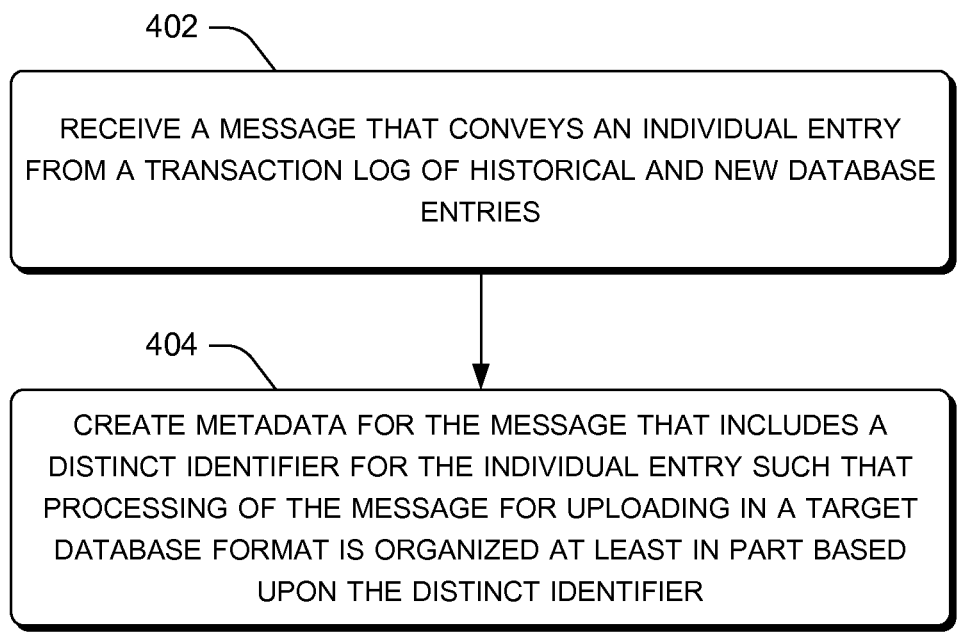

FIG. 4 illustrates a flowchart of another record synchronization technique or method 400.

At block 402, the method can receive a message that conveys an individual entry from a transaction log of historical and new database entries.

At block 404, the method can create metadata for the message that includes a distinct identifier for the individual entry such that processing of the message for uploading in a target database format is organized at least in part based upon the distinct identifier. For instance, in the above example from FIG. 3, regarding patients A and B, three messages can be received that convey the lab results, images, and blood pressure data for patient A as indicated by their metadata. The fourth message can convey the blood pressure data for patient B.

The processing of the four messages can be based upon the metadata. For instance, the three messages relating to patient A may be grouped for processing as a first set. Upon completion of processing the first set, the fourth message regarding patient B may be processed. In some cases, the first set of data relating to patient A may be processed in parallel (e.g., along multiple parallel processing paths) and then processing of the second set of data can be handled. For instance, multiple parallel processing paths may be employed to convert the data from the first three messages that share a common identifier into a target database format and then upload that converted data into the target database. Then the process can be employed on the message relating to patient B. Of course, this is only one example of how the distinct identifier can be leveraged to facilitate conversion and uploading of data to the target database.

The order in which the example methods are described is not intended to be construed as a limitation, and any number of the described blocks or steps can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a computing device causes the computing device to perform the method.

Conclusion

Although techniques, methods, devices, systems, etc., pertaining to record synchronization are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. At least one computer-readable storage medium having instructions stored thereon that, when executed by a computing device, cause the computing device to perform acts, the acts comprising:
    performing synchronization of a source database to a target database by processing historical data and new data of the source database for conversion from a source format of the source database to a target format of the target database, wherein the source format and the target format are different formats, the processing comprising:
        causing the historical data of the source database to be recorded as historical entries on a transaction log, wherein the historical data is already stored in the source database when the synchronization is commenced,
        subsequently causing the new data of the source database to be recorded as new entries on the transaction log with the historical entries, wherein the new data is not present in the source database when the synchronization is commenced,
        identifying a distinct attribute associated with an individual historical entry,
        generating a message that reflects the individual historical entry, and
        sending the message to another computing device for uploading into the target database in the target format,
    wherein the transaction log is created after the historical data is already stored in the source database.

2. The computer-readable storage medium of claim 1, wherein the causing the historical data to be recorded comprises recording the historical data on the transaction log in the same manner as the new data are recorded on the transaction log for the synchronization between the source database and the target database.

3. The computer-readable storage medium of claim 1, wherein the acts further comprise:
    at start-up of the synchronization, uploading the historical data to the target database as one or more data changes of the transaction log and uploading the new data to the target database as one or more other data changes of the transaction log.

4. The computer-readable storage medium of claim 1, wherein the causing and the subsequently causing comprise generating views of the historical data and the new data from the source database and generating the transaction log from the views.

5. The computer-readable storage medium of claim 1, wherein the identifying comprises generating the distinct attribute from the historical data.

6. The computer-readable storage medium of claim 1, further comprising associating the distinct attribute with the message as metadata.

7. The computer-readable storage medium of claim 1, wherein the identifying the distinct attribute comprises identifying a patient identifier.

8. The computer-readable storage medium of claim 1, wherein the message includes a historical data record associated with the individual historical entry.

9. The computer-readable storage medium of claim 1, wherein the message is in a markup language format.

10. The computer-readable storage medium of claim 1, wherein the processing comprises utilizing context-neutral processing for conversion into the target format of the target database.

11. The computer-readable storage medium of claim 1, wherein the processing is performed on a client side and the message is sent to a server side.

12. The computer-readable storage medium of claim 1, the processing further comprising:
    queuing the message for converting into the target format of the target database based upon the distinct attribute.

13. The computer-readable storage medium of claim 12, wherein the queuing groups the converting for a set of messages that share the distinct attribute.

14. At least one computer-readable storage medium having instructions stored thereon that, when executed by a computing device, cause the computing device to perform acts, the acts comprising:
    receiving a first message that conveys a first entry from a transaction log of database entries, the database entries including new database entries and historical database entries;
    receiving a second message that conveys a second entry from the transaction log of database entries;
    creating a first metadata tag for the first message, the first metadata tag including a first distinct identifier for the first entry, wherein the first distinct identifier indicates that the first message belongs to a first processing job such that processing of the first message for uploading in a target database format is performed by the first processing job with a first group of messages that are also associated with the first distinct identifier; and
    creating a second metadata tag for the second message, the second metadata tag including a second distinct identifier for the second entry, wherein the second distinct identifier indicates that the second message belongs to a second processing job such that processing of the second message for uploading in the target database format is performed by the second processing job with a second group of messages that are also associated with the second distinct identifier.

15. The computer-readable storage medium of claim 14, wherein the first distinct identifier is associated with a first patient and the second distinct identifier is associated with a second patient.

16. The computer-readable storage medium of claim 14 wherein the first processing job and the second processing job operate in parallel.

17. A system, comprising:
a data acquisition and distribution tool configured to:
   obtain a first message, wherein the first message relates to first changed data in a source database of records,
   obtain a second message, wherein the second message relates to second changed data in the source database of records,
   identify a first identifier associated with the first message and a second identifier associated with the second message,
   attach the first identifier to the first message as first metadata and attach the second identifier to the second message as second metadata, and,
   specify a first processing path from available parallel processing paths, wherein the first processing path is configured to convert the first changed data into a target format and upload the first converted data into a target database, the first processing path being specified based at least in part on the first identifier of the first metadata;
   specify a second processing path from the available parallel processing paths, wherein the second processing path is configured to convert the second changed data into the target format and upload the second converted data into the target database, the second processing path being specified based at least in part on the second identifier of the second metadata; and
a computing device configured to execute the data acquisition and distribution tool.

18. The system of claim 17, further comprising a view generation tool configured to generate views of historical entries and new entries of the source database, and a change tracking tool configured to generate a context-neutral transaction log from the views.

19. The system of claim 17, further comprising a change capture tool configured to generate the first message from a context-neutral transaction log.

20. The system of claim 19, wherein the data acquisition and distribution tool and the change capture tool both occur on the computing device.

* * * * *